(12) United States Patent  
Nagayoshi et al.

(10) Patent No.: US 9,884,655 B1  
(45) Date of Patent: Feb. 6, 2018

(54) STRUCTURE FOR MOUNTING VEHICLE HEAT EXCHANGER

(71) Applicant: MAZDA MOTOR CORPORATION, Hiroshima (JP)

(72) Inventors: Masayuki Nagayoshi, Hiroshima (JP); Naoki Nagano, Hiroshima (JP); Megumi Toyota, Hiroshima (JP); Nobuyuki Nakayama, Hiroshima (JP); Masahide Kanemori, Hiroshima (JP); Haruo Etchu, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/637,917

(22) Filed: Jun. 29, 2017

(30) Foreign Application Priority Data

Jul. 13, 2016 (JP) .................................. 2016-138674  
Mar. 29, 2017 (JP) .................................. 2017-064658

(51) Int. Cl.  
*B60K 11/04* (2006.01)  
*B62D 25/08* (2006.01)

(52) U.S. Cl.  
CPC ............ *B62D 25/084* (2013.01); *B60K 11/04* (2013.01)

(58) Field of Classification Search  
CPC .................................. B62D 25/84; B60K 11/04  
See application file for complete search history.

(56) References Cited

U.S. PATENT DOCUMENTS

| | | | | |
|---|---|---|---|---|
| 6,729,681 | B2 * | 5/2004 | Yustick | B62D 25/084 180/68.4 |
| 7,150,335 | B2 * | 12/2006 | Sasano | B62D 25/084 123/41.49 |
| 7,918,193 | B2 * | 4/2011 | Kojima | B60H 1/322 123/41.04 |

FOREIGN PATENT DOCUMENTS

DE     10 2014 205 223 A1    9/2015  
JP        2001-080542 A      3/2001

* cited by examiner

*Primary Examiner* — John Walters  
*Assistant Examiner* — James Triggs  
(74) *Attorney, Agent, or Firm* — Studebaker & Brackett PC

(57) ABSTRACT

Disclosed herein is a structure for mounting a heat exchanger in a vehicle. The structure includes a shroud, and a mount supporting a supported portion and allowing vertical vibrations of the supported portion with respect to each side of the shroud in a vehicle width direction. The supported portion is provided on each side of the heat exchanger in the vehicle width direction. The mount body of the mount is mounted in a mounting portion located higher than a fixed portion on the side of the shroud in the vehicle width direction. The fixed portion is fixed to a body member of the vehicle. A receiver supporting a lower surface of the mount body serves as the mounting portion. A fixing bracket for fixing the mount body to the side of the shroud is provided in front of or behind the mount body of the mount in the vehicle.

12 Claims, 12 Drawing Sheets

STRUCTURE FOR MOUNTING VEHICLE HEAT EXCHANGER

CROSS-REFERENCE TO RELATED APPLICATION

This application claims priority to Japanese Patent Application No. 2016-138674 filed on Jul. 13, 2016 and Japanese Patent Application No. 2017-064658 filed on Mar. 29, 2017, the entire disclosure of which is hereby incorporated by reference.

BACKGROUND ART

The present disclosure relates to a structure for mounting a heat exchanger in a vehicle.

According to a known structure, a vehicle heat exchanger (e.g., a radiator for cooling an engine coolant) is attached to a vehicle body member via a shroud. An upper mount is placed between the top of the heat exchanger and the top of the shroud, and a lower mount is placed between the bottom of the heat exchanger and the bottom of the shroud such that the heat exchanger serves as a dynamic damper.

For example, Japanese Unexamined Patent Publication No. 2001-80542 (Patent Document 1) discloses a structure including brackets. Each bracket includes a fixed portion and a projection support. The fixed portion is fixed to a mount member at an upper portion of a vehicle body. The projection support supports a projection (e.g., a pin) projecting from a side surface of an upper tank of the heat exchanger (i.e., a radiator). In order to allow vertical vibrations of the heat exchanger, the projection is supported by the projection support of the bracket to be vertically movable. As a result, the heat exchanger serves as a dynamic damper.

German Patent Publication No. 102014205223 (Patent Document 2) discloses a structure supporting each side of a radiator in the vehicle width direction by a side of a carrier (i.e., a shroud) in the vehicle width direction via a mount, and clip-fastening a mount bracket of the mount to the carrier.

SUMMARY

The following problem occurs in the structure, in which the upper mount is placed between the top of the heat exchanger and the top of the shroud, and the lower mount is placed between the bottom of the heat exchanger and the bottom of the shroud. The weight of the heat exchanger is applied particularly to the bottom of the lower mount and the bottom of the shroud. The strength of the bottom of the shroud for supporting the lower mount is thus insufficient, which makes it difficult to provide reliable characteristics as the dynamic damper. An attempt to increase the strength of the bottom of the shroud results in a thicker bottom, thereby increasing the weight of the shroud.

To address this problem, as described in Patent Document 1 and Patent Document 2, it is conceivable to provide a mount (a so-called "hanging-type mount") on the top of each side of the heat exchanger in the vehicle width direction to support the weight of the heat exchanger.

However, in the case of the hanging-type mount, the shroud needs to support the weight of the heat exchanger via the mount, at the portion supporting the mount. Even in this case, the shroud has hardly sufficient strength to support the mount. The following problem occurs in the structure described in Patent Document 2, in which the mount bracket of the mount is clip-fastened to the carrier (i.e., shroud). When a used heat exchanger is replaced with a new one, it is difficult to attach and detach the heat exchanger to and from the shroud, which is fixed to the vehicle body member. In particular, detaching the clip of the mount bracket is difficult.

The present disclosure was made to provide a structure for mounting a vehicle heat exchanger, in which a shroud has sufficient strength to support mounts, and vehicle heat exchangers are easily attached to and detached from the shroud, when a used vehicle heat exchanger is replaced with a new one.

The present disclosure provides the following structure for mounting a heat exchanger in a vehicle.

This structure for mounting the heat exchanger includes: a shroud supporting the heat exchanger, allowing vertical vibrations of the heat exchanger, and including, on each side of the shroud in a vehicle width direction, a fixed portion fixed to a body member of the vehicle; and a mount supporting a supported portion, and allowing vertical vibrations of the supported portion with respect to the side of the shroud in the vehicle width direction, the supported portion provided on each side of the heat exchanger in the vehicle width direction. The mount includes a mount body holding an elastic member, and supporting the supported portion on the side of the shroud via the elastic member. The mount body of the mount is mounted in a mounting portion located higher than the fixed portion on the side of the shroud. A receiver supporting a lower surface of the mount body serves as the mounting portion. A fixing bracket for fixing the mount body to the side of the shroud is provided in front of or behind the mount body of the mount in the vehicle.

In this configuration, the vertically extending walls exist on both sides of the shroud in the vehicle width direction. The vertically extending walls have higher strength against a vertical load than the horizontally extending walls on the top and bottom of the shroud. Thus, the shroud has sufficient strength to support the mounts (and eventually the heat exchanger). In addition, the fixed portion is provided on each side of the shroud in the vehicle width direction. The whole shroud including the heat exchanger is supported by the body member of the vehicle with sufficient strength. The fixing bracket is provided in front of or behind the mount body in the vehicle. For example, bolts are fastened to and loosened from the mount body from the front or rear of the vehicle (i.e., from the front or rear of the shroud) to attach and detach the fixing brackets to and from the shroud. As a result, when a used heat exchanger is replaced with a new one, the heat exchangers can be easily attached to and detached from the shroud.

In one preferred embodiment of the structure for mounting the heat exchanger, a housing recess serves as the mounting portion, is provided in a surface of each side of the shroud facing the rear of the vehicle, houses the mount body of the mount, and has an open rear end. An upper surface of a lower wall of the housing recess serves as the receiver of the mounting portion. The fixing bracket is provided behind the housing recess in the vehicle.

With this configuration, the heat exchanger is easily supported by the housing recess. The shroud has an increased strength to support the mount. The fixing bracket reduce the risk of the mount (i.e., the mount body) being removed from the housing recess.

In one preferred embodiment, where the mounting portion is the housing recess, the upper surface of the lower wall of the housing recess is an inclined surface inclined upward toward an inside of the housing recess so that an insertion of the mount body of the mount attached to the supported portion, which is located on each side, in the vehicle width direction, of the heat exchanger put on a bottom of the shroud, into the housing recess from the open rear end to the inside of the housing recess, which is provided on each side of the shroud in the vehicle width direction, allows the heat exchanger to float above the bottom of the shroud.

With this configuration, with the heat exchanger being mounted on the bottom of the shroud, the insertion of the mount body attached to the supported portion of the heat exchanger allows the heat exchanger to flow above the bottom of the shroud. As a result, the heat exchanger, together with the mount, can be attached to the shroud easily and appropriately. This improves the attachment of the heat exchanger and the mount to the shroud.

In one preferred embodiment, where the upper surface of the lower wall of the housing recess (i.e., the receiver) is inclined as described above, the lower surface of the mount body includes an inclined portion inclined in accordance with the inclined surface of the receiver, and a curving portion provided in front of the inclined portion in the vehicle to be continuous with the inclined portion, and curving upward toward the front of the vehicle.

With this configuration, when the mount body attached to the supported portion of the heat exchanger is inserted into the housing recess, the inclined portion continuous with the curving portion is easily placed on the inclined surface of the receiver. This facilitates the insertion of the mount body into the housing recess. During this insertion, the inclined portion slides on the inclined surface of the receiver. However, the curving portion floats above the inclined surface of the receiver. Thus, the sliding friction of the inclined portion against the inclined surface of the receiver is low as compared to the case where no curving portion is provided and almost the entire lower surface of the mount body in the vehicle longitudinal direction is the inclined surface.

In one preferred embodiment, where the lower surface of the mount body includes the inclined portion and the curving portion, the lower surface of the mount body includes a projection projecting downward from an intermediate portion of the lower surface in the vehicle width direction, and extending in a vehicle longitudinal direction, a lower surface of the projection includes the inclined portion and the curving portion, the upper surface of the lower wall of the housing recess includes a fitting recess receiving the projection fitted therein, and recessed to extend in the vehicle longitudinal direction, and a bottom surface of the fitting recess includes the inclined surface of the receiver.

With this configuration, the projection is fitted in the fitting recess so that the heat exchanger is positioned with respect to the shroud in the vehicle width direction. This stabilizes the vertical vibration characteristics of the heat exchanger with respect to the shroud provided by the mount on each side of the shroud in the vehicle width direction.

In one preferred embodiment, a width of a front part of the projection in the vehicle width direction decreases toward the front of the vehicle.

Even if the heat exchanger is slightly shifted from the shroud in the vehicle width direction, the projection is easily fitted in the fitting recess. After the projection is completely fitted into the fitting recess, the heat exchanger is positioned with respect to the shroud in the vehicle width direction.

In one preferred embodiment, where the mounting portion is the housing recess, the lower wall of the housing recess includes ribs extending in the vehicle longitudinal direction and a vehicle vertical direction. Upper surfaces of the ribs of the lower wall of the housing recess serve as the receiver of the mounting portion.

With this configuration, the ribs allow the lower wall of the recess to be thinner and stronger.

In one preferred embodiment of the structure for mounting the heat exchanger, a clip is provided on the upper surface of the mount body, and is engaged with the shroud, when the mount body is mounted in the mounting portion.

With this configuration, after the mount body is completely inserted into the housing recess, the clip allows the shroud to hold the mount body temporarily, thereby facilitating fixing of the fixing bracket to the shroud.

In one preferred embodiment of the structure for mounting the heat exchanger, the heat exchanger includes a tank on each side in the vehicle width direction. The tank extends in a vehicle vertical direction. The supported portion is provided on the tank.

This increases the strength of the portion of the heat exchanger provided with the supported portion.

In one preferred embodiment of the structure for mounting the heat exchanger, the supported portion is a projection projecting outward from the side of the heat exchanger in the vehicle width direction. A hole is formed in the elastic member of the mount to receive the projection fitted therein. The hole of the elastic member of the mount and the projection fitted in the hole are configured not to allow movement of the elastic member about the projection.

With this configuration, with the projection inserted into the hole of the elastic member of each mount, the heat exchanger is, together with the mount, attached to the shroud. In particular, as described above, when the mount body of the mount is inserted into the housing recess, the inclined surface of the receiver is utilized to allow the heat exchanger to float above the bottom of the shroud. In this case, the elastic member (i.e., the mount body) does not move about the projection to smoothen the attachment of the heat exchanger and the mount to the shroud.

In one preferred embodiment of the structure for mounting the heat exchanger, the lower surface of the heat exchanger is provided with a pin projecting downward and having a circumference covered by the elastic member. An insertion hole, into which the pin and the elastic member are inserted, is formed in the bottom of the shroud. A gap of a predetermined degree is formed between an outer peripheral surface of the elastic member and an inner peripheral surface of the insertion hole.

With this configuration, even if the heat exchanger attempts to vibrate with respect to the shroud in the direction perpendicular to the vertical direction (i.e., in the horizontal direction such as the longitudinal direction and the vehicle width direction) at a degree greater than the predetermined degree, the outer peripheral surface of the elastic member abuts on the inner peripheral surface of the insertion hole to reduce such strong horizontal vibrations. When the outer peripheral surface of the elastic member abuts on the inner peripheral surface of the insertion hole, no sound occurs.

In one preferred embodiment of the structure for mounting the heat exchanger, the heat exchanger includes a cooling fan configured to generate cool air passing through the heat exchanger from its front to rear, the shroud includes an enclosure surrounding upper, lower, and two side surfaces of the heat exchanger in the vehicle width direction, and a sealing member is provided between the enclosure and each of the upper, lower, and side surfaces of the heat exchanger in the vehicle width direction to reduce the cool air passing therethrough and returning to the front of the heat exchanger.

This configuration reduces the return of the cool air heated through the heat exchanger to the front of the heat exchanger. This results in reduction in the heated cool air passing through the heat exchanger from the front to the rear (recirculation of the cool air) again.

DETAILED DESCRIPTION

Figure 1:
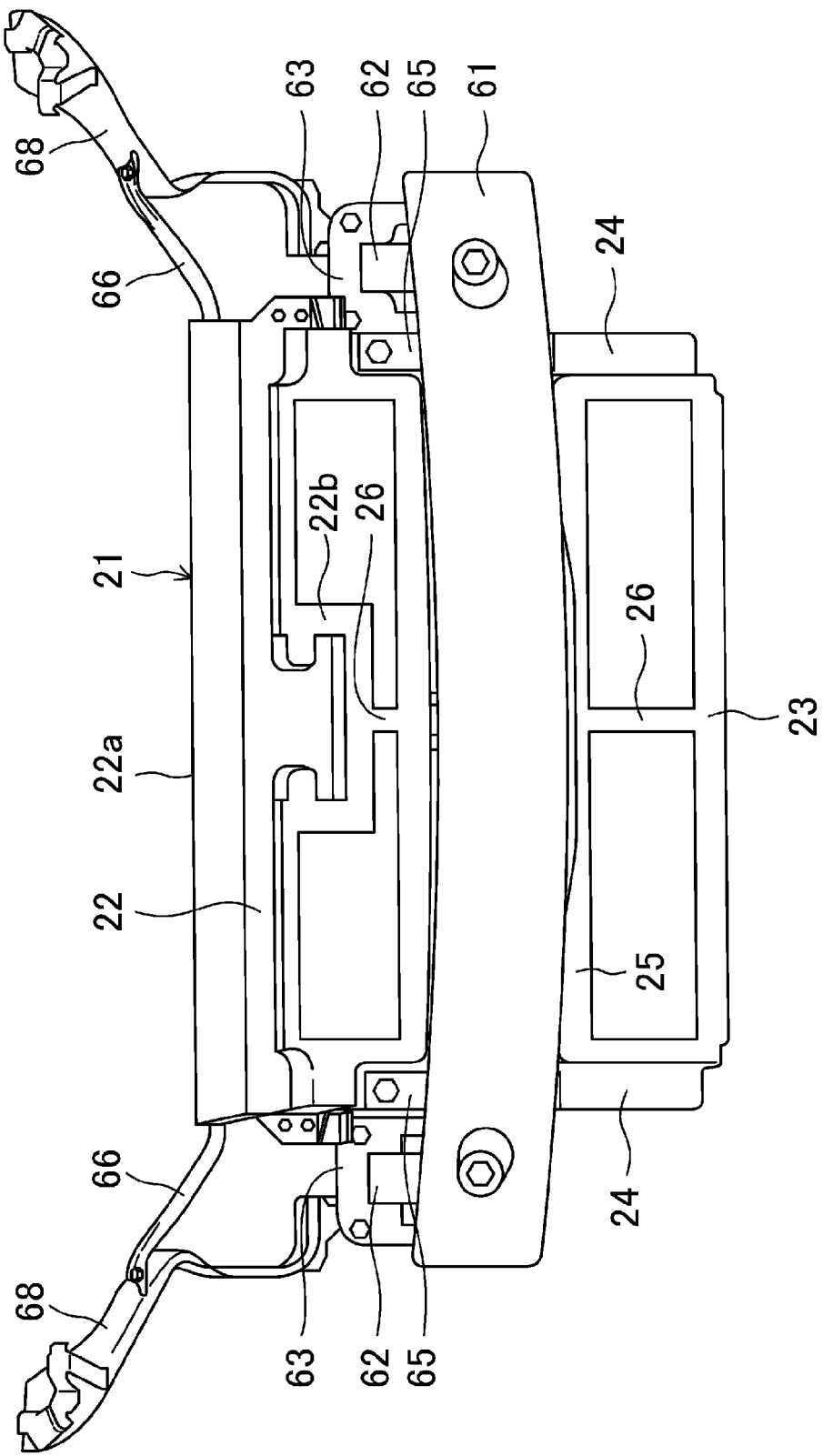
FIG. 1 is a perspective view of a shroud fixed to a bumper beam as viewed from the front and top of a vehicle. The shroud supports a radiator which serves as a vehicle heat exchanger with a mounting structure according to a first exemplary embodiment.

Exemplary embodiments of the present disclosure will now be described in detail with reference to the drawings.
First Exemplary Embodiment FIG. 1 illustrates a resin shroud 21 fixed to a bumper beam 61. The shroud 21 supports a radiator 1 (see FIGS. 4 and 5) which serves as a vehicle heat exchanger having a mounting structure according to a first exemplary embodiment. The bumper beam 61 is a body member of a vehicle (e.g., a motor vehicle). In this exemplary embodiment, the radiator 1 cools an engine coolant. In the following description, the front, rear, right, and left of the vehicle are simply referred to as the "front," "rear," "right," and "left." The other positional terms including "longitudinal," "vertical," "behind," "forward," and "backward" indicate the positional relations with respect to the vehicle.

Figure 2:
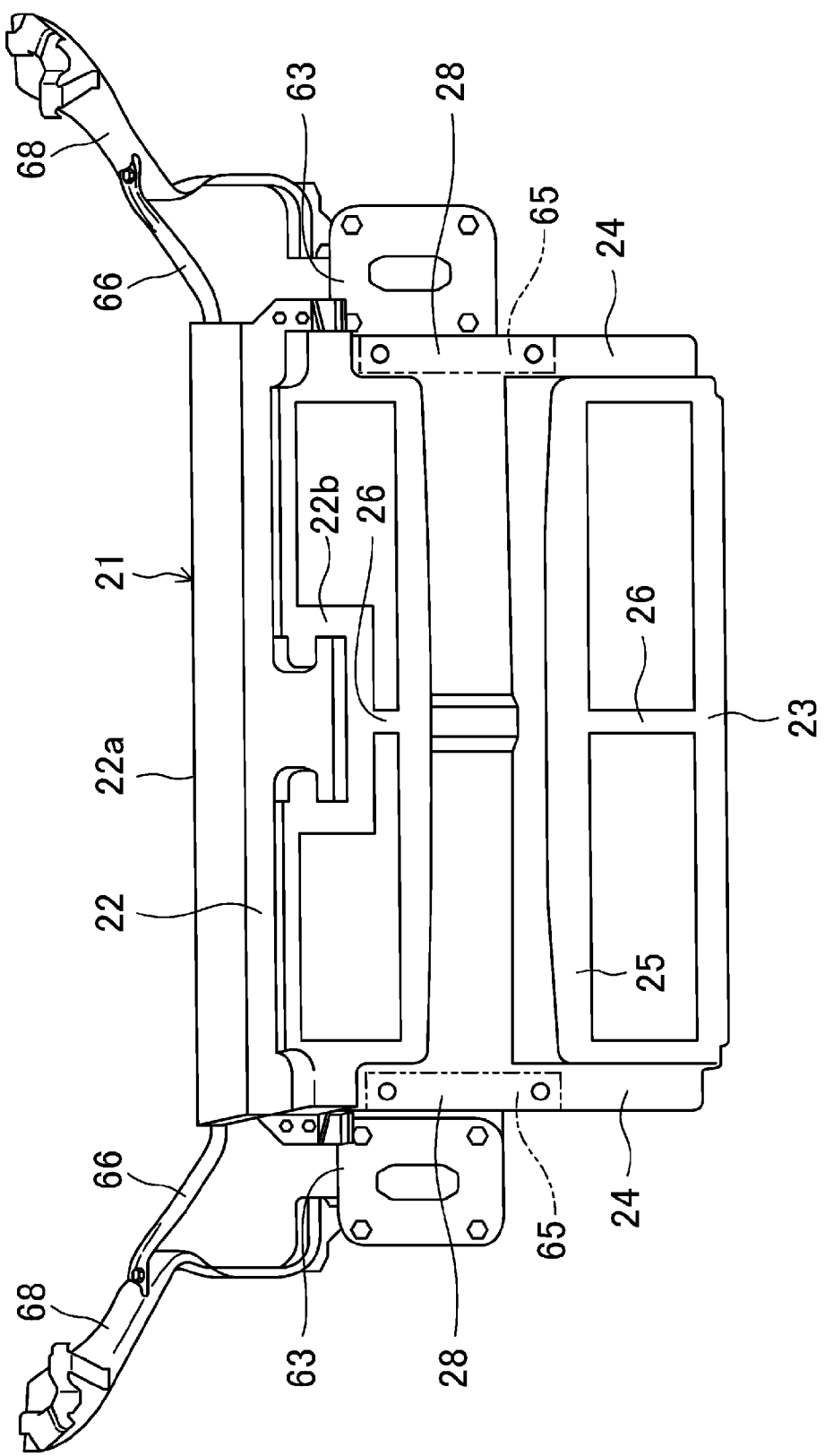
FIG. 2 is a perspective view corresponding to FIG. 1 but excluding a bumper beam and a crash can.
Figure 3:
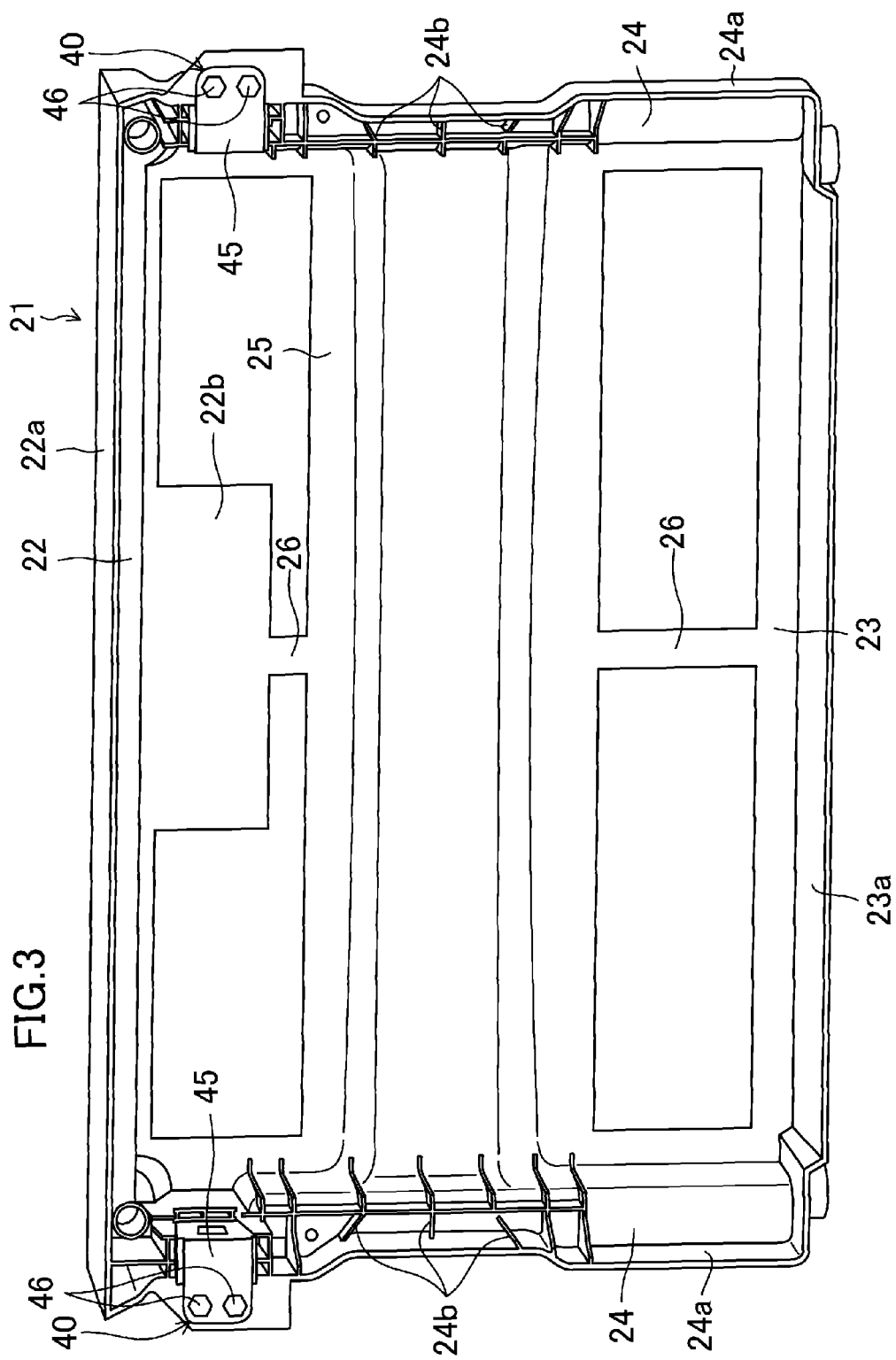
FIG. 3 illustrates a mount attached to the shroud as viewed from the rear of the vehicle.

As also shown in FIGS. 2 and 3, the shroud 21 includes an upper wall 22, a lower wall 23, and side walls 24 and 24. The upper and lower walls 22 and 23 extend in the vehicle width direction to face each other vertically. One of the side walls 24 connects the right ends of the upper and lower walls 22 and 23. The other side wall 24 connects the left ends of the upper and lower walls 22 and 23. The side walls correspond to the sides of the shroud 21 in the vehicle width direction. The shroud 21 is formed in a frame a substantially rectangular frame as viewed longitudinally. The upper, lower, right, and left side walls 22, 23, 24, and 24 of the shroud 21 are located in front of the top, bottom, right, and left of the radiator 1. The radiator has a substantially rectangular shape as viewed longitudinally. In FIGS. 1 and 2, the radiator 1 behind the shroud 21 is not shown. The radiator 1 is actually seen within the shroud 21 as a frame.

The upper wall 22 of the shroud 21 has a rear extension 22a at its upper end. The lower wall 23 of the shroud 21 has a rear extension 23a at its lower end. The right and left walls 24 and 24 of the shroud 21 have rear extensions 24a and 24a at their outer ends in the vehicle width direction, respectively. (See FIGS. 3 and 4.) The rear extensions 22a, 23a, 24a, and 24a extend rearward (i.e., toward the radiator 1) while facing the upper, lower, right, and left side surfaces of the radiator 1. That is, the rear extensions 22a, 23a, 24a, and 24a form an enclosure surrounding the upper, lower, right, and left side surfaces of the radiator 1.

The right and left side walls 24 and 24 of the shroud 21 are connected together by a horizontally extending connector 25, which extends horizontally in the vehicle width direction. A projection 22b projecting downward is formed at a central portion of the upper wall 22 of the shroud 21 in the vehicle width direction. The central portion of this projection 22b in the vehicle width direction is connected to the central portion of the upper end of the horizontally extending connector 25 in the vehicle width direction by a vertically extending connector 26. The central portion of the lower wall 23 in the vehicle width direction is connected to the central portion of the lower end of the horizontally extending connector 25 in the vehicle width direction by another vertically extending connector 26.

The bumper beam 61 is composed of two plate members overlapping each other in the longitudinal direction. The bumper beam 61 extends in the vehicle width direction in front of the horizontally extending connector 25 of the shroud 21. Each end of the bumper beam 61 in the vehicle width direction is fixed to the front end (i.e., flange) of a right or left front side frame 63 via a right or left crash can 62. The shroud 21 is located between the right and left crash cans 62 and 62.

A fixed portion 28 is provided at a vertically central portion of each of the right and left side walls 24 and 24 of the shroud 21. The fixed portion 28 is fixed to the vehicle body (specifically, the bumper beam 61) via bolts (not shown). Each side wall 24 includes reinforcing ribs 24b, 24b, . . . , on the back surface of the fixed portion 28.

Vehicle body brackets 65 and 65 are fixed to the back surface of the bumper beam 61 in a position facing the right and left side walls 24 and 24 to project toward the side walls 24 and 24. Each vehicle body bracket 65 abuts on and is fastened to the front surface of the fixed portion 28 of the associated side wall 24. In this manner, the sides of the shroud 21 in the vehicle width direction is fixed to the bumper beam 61 (i.e., the fixed portions 28 and 28 of the right and left side walls 24 and 24) via the vehicle body brackets 65 and 65.

One end of a support bracket 66 is fixed to one end of the upper wall 22 of the shroud 21 in the vehicle width direction. The other end of the support bracket 66 is fixed to a right or left apron reinforcing member 68, which is fixed to a right or left front side frame 63. In this manner, the upper wall 22 of the shroud 21 is fixed to the right and left apron reinforcing members 68 and 68 via the support brackets 66 and 66.

Figure 4:
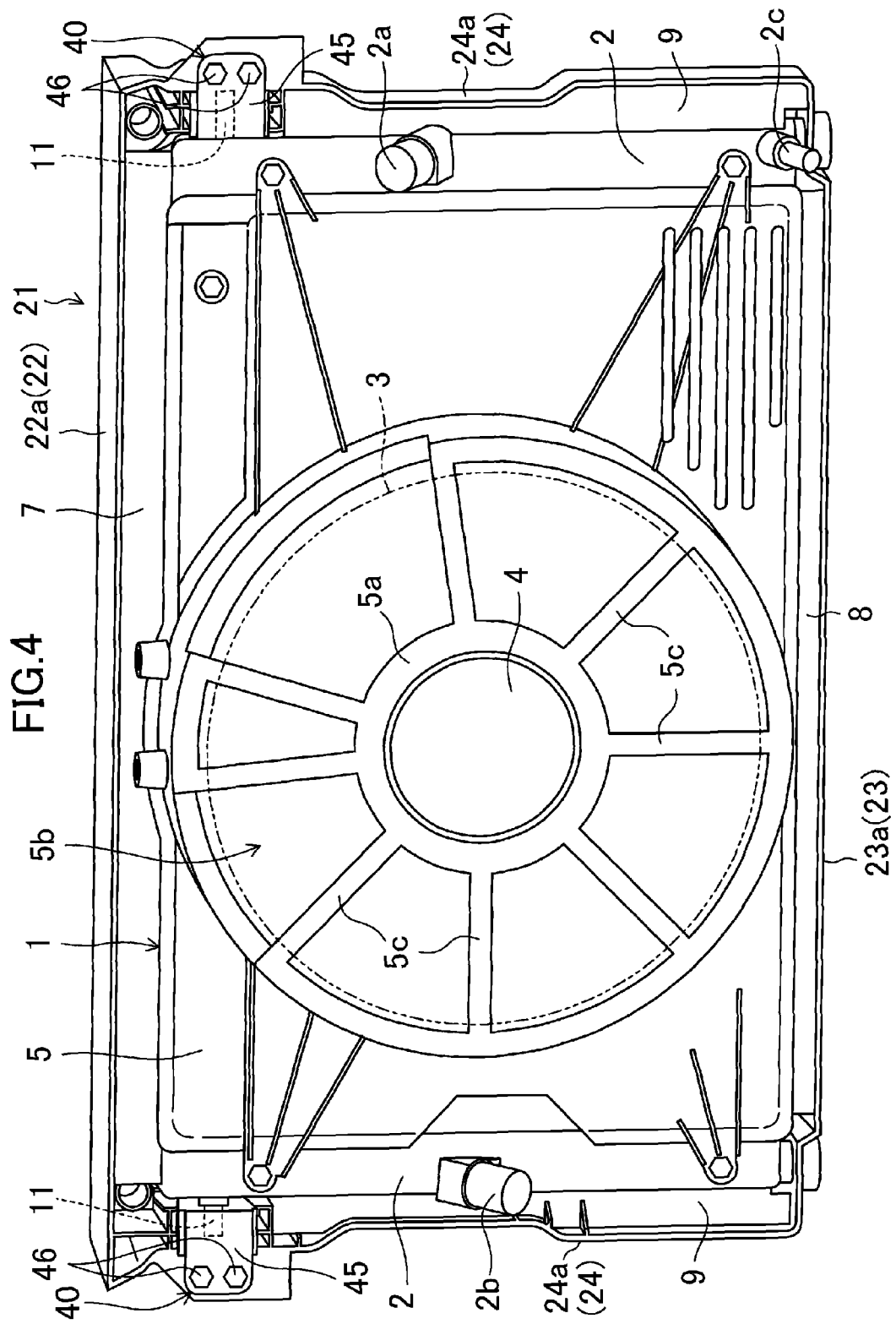
FIG. 4 illustrates the radiator and the mount assembled with the shroud as viewed from the rear of the vehicle.
Figure 5:
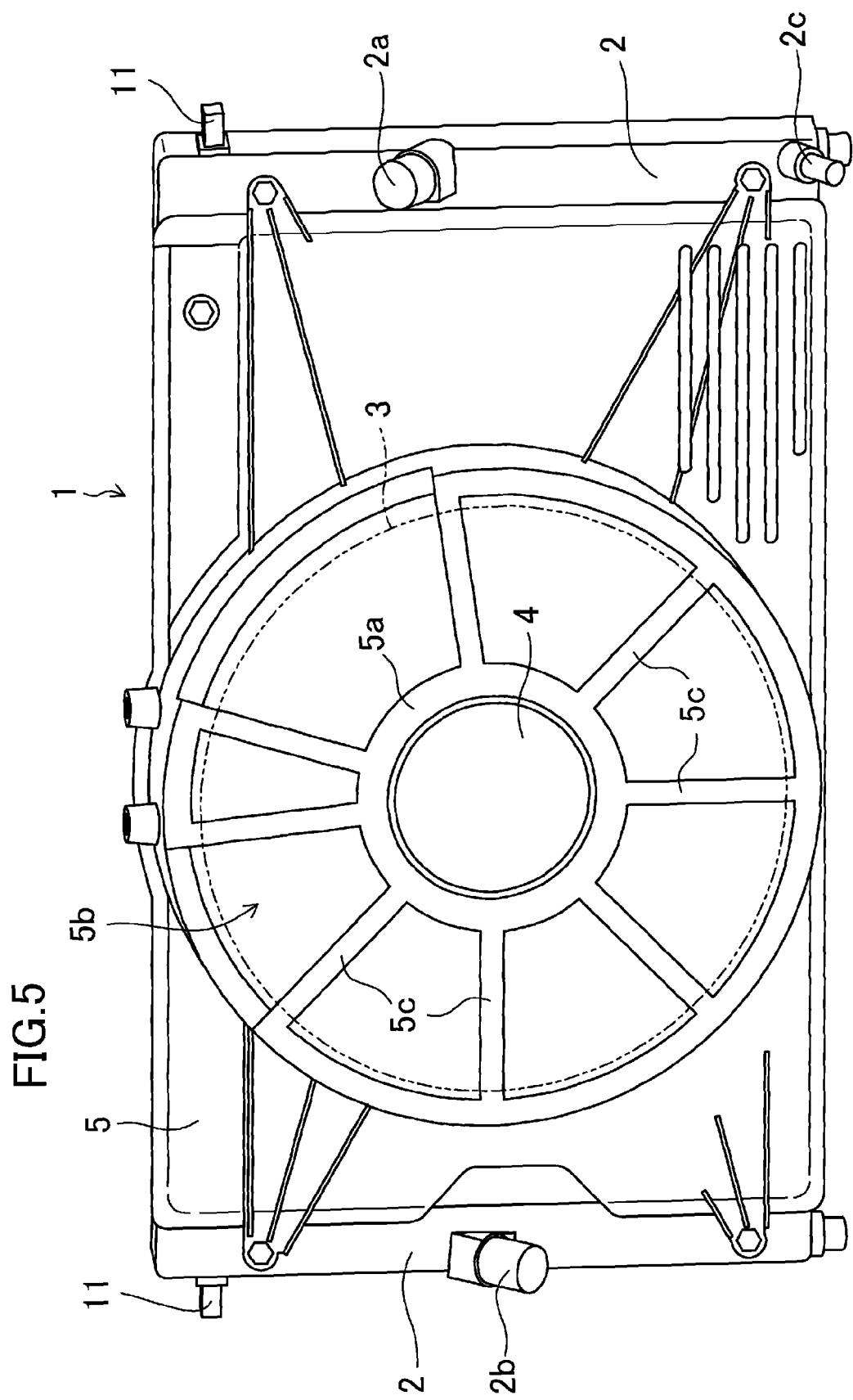
FIG. 5 is a perspective view of the radiator as viewed approximately from the rear of the vehicle.

As shown in FIGS. 4 and 5, the radiator 1 includes a vertically extending tank 2 on each side in the vehicle width direction. That is, in this exemplary embodiment, the radiator 1 is a cross-flow radiator including the tank 2 on each side of the radiator 1 in the vehicle width direction. The right tank 2 (on the right of FIGS. 4 and 5) includes an inlet pipe connector 2a connected to an inlet pipe, through which an engine coolant flows into the tank 2. On the other hand, the left tank 2 (on the left of FIGS. 4 and 5) includes an outlet pipe connector 2b connected to an outlet pipe, through which the engine coolant cooled by the radiator 1 flows out of the tank 2. The right tank 2 has, at its lower end, a drain pipe connector 2c connected to a drain pipe.

At the rear of the radiator 1, a cooling fan 3 is provided to generate cool air passing through the radiator 1 from its front to its rear. In FIGS. 4 and 5, the cooling fan 3 is simply indicated in a circle of a dash-dot-dot line. This cooling fan 3 is driven by an electric motor 4 which is supported by a motor support 5a of a fan shroud 5 placed at the rear of the radiator 1. A through-hole 5b is formed around the motor support 5a. The cool air passes through the through-hole 5b. The motor support 5a is supported by supports 5c, 5c, . . . , crossing the through-hole 5b radially.

Four sealing members 7, 8, 9, and 9 are provided between the upper, lower, and right and left side surfaces of the radiator 1 and the enclosure (i.e., the rear extensions 22a, 23a, 24a, and 24a, respectively) (see FIG. 4). Specifically, the upper sealing member 7 is provided between the upper surface of the radiator 1 and the rear extension 22a of the upper wall 22 of the shroud 21. The lower sealing member 8 is provided between the lower surface of the radiator 1 and the rear extension 23a of the lower wall 23 of the shroud 21. One of the side sealing members 9 is provided between the right side surface of the radiator 1 and the rear extension 24a of the right side wall 24 of the shroud 21 in a region lower than the position of a mount 40, which will be described later. The other sealing member 9 is provided between the left side surface of the radiator 1 and the rear extension 24a of the left side wall 24 of the shroud 21 in the region lower than the position of the mount 40, which will be described later. These four sealing members 7, 8, 9, and 9 block the cool air from passing through the gaps between the enclosure of the shroud 21 and the upper, lower, and right and left side surfaces and returning to the front. The four sealing member 7, 8, 9, and 9 reduce the cool air warmed through the radiator 1 from passing through the radiator 1 from its front to rear again after having returned to the front through the gaps (recirculation of the cool air).

The radiator 1 is supported by the mounts 40 and 40 provided on the right and left side walls 24 and 24 of the shroud 21 respectively to vibrate vertically with respect to the shroud 21. In other words, these mounts 40 and 40 support supported portions on the sides of the radiator 1 in the vehicle width direction (the right and left tanks 2 and 2 of the radiator 1 in this exemplary embodiment) to allow vertical vibrations of the radiator 1 with respect to the right and left side walls 24 and 24 of the shroud 21. In this exemplary embodiment, the supported portions are bar-like projections 11(see FIG. 5) projecting outward beyond the sides (i.e., the tanks 2) of the radiator 1 in the vehicle width direction. The projections 11 have a square cross-section.

Each mount 40 includes a mount body 41 and a fixing bracket 45. The mount body 41 holds an elastic member 43 made of, for example, rubber, and supports the projections 11 on the side wall 24 of the shroud 21 via the elastic member 43. The mount body 41 of each mount 40 includes the elastic member 43 and a resin holding member 44. The elastic member 43 has a rectangular cross-section extending in the vehicle width direction. The holding member 44 covers the upper, front, and the lower surfaces of the elastic member 43. The holding member 44 holds the elastic member 43 together with the fixing bracket 45 covering the back surface of the elastic member 43. In this exemplary embodiment, the fixing bracket 45 is made of resin to be integral with the holding member 44. The fixing bracket 45 and the holding member 44 form a cylindrical shape surrounding the elastic member 43. A part of the fixing bracket 45 (e.g., the part covering the back surface of the elastic member 43) may be regarded as the holding member 44.

Each fixing bracket 45 is fixed to one of the side walls 24 and 24 of the shroud 21 by two bolts 46 and 46. This fixture also fixes the mount body 41 of the associated mount 40 to the side wall 24 of the shroud 21. In short, each fixing bracket 45 is used to fix the associated mount body 41 (i.e., the associated mount 40) to the side wall 24 of the shroud. In this exemplary embodiment, each fixing bracket 45 is provided at the rear of the mount body 41. Each fixing bracket 45 may be independent from the holding member 44.

Figure 6:
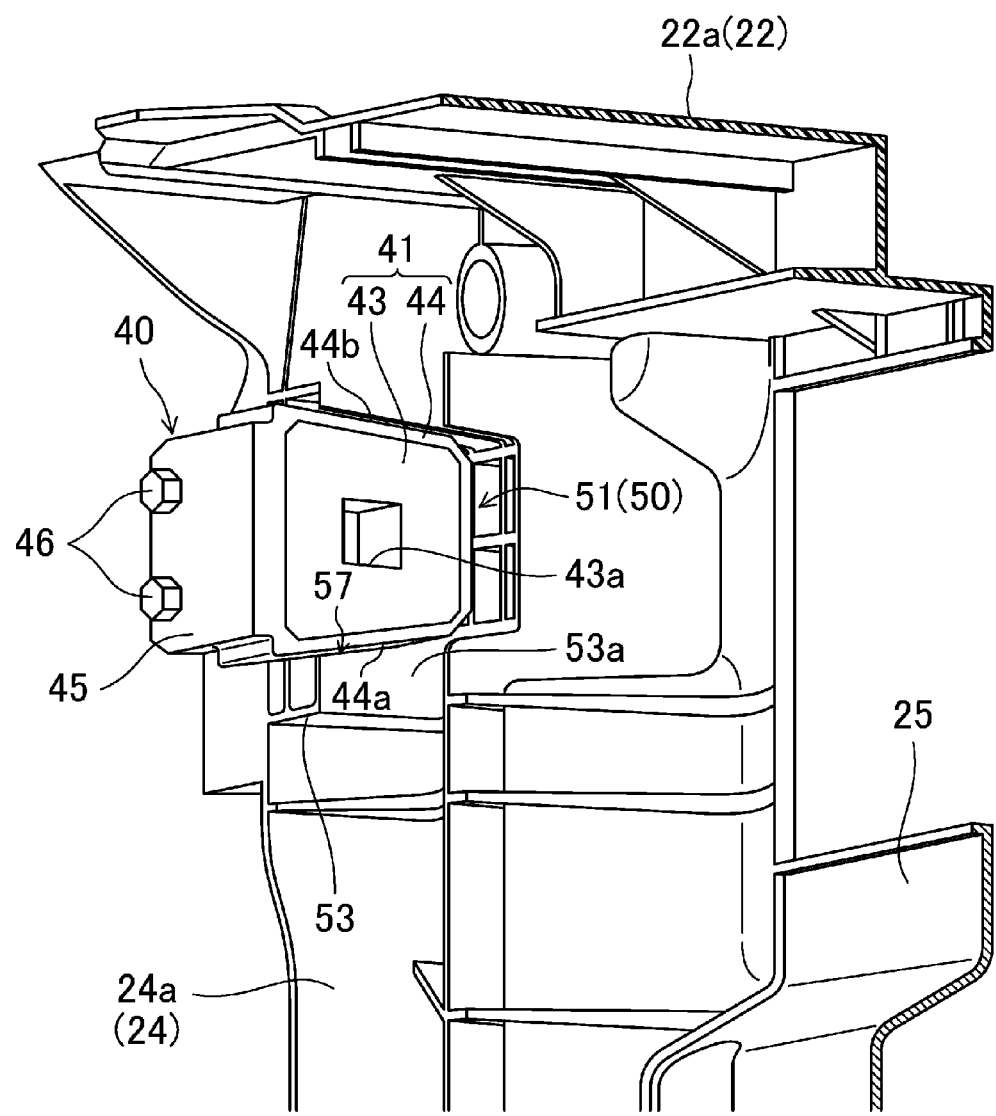
FIG. 6 is an enlarged cross-sectional perspective view of a housing recess, its proximity, and a mount body (i.e., the mount) as viewed from the inside of the vehicle in the vehicle width direction and the rear of the vehicle. The housing recess is located on the left of the shroud. The mount body is mounted and housed in the housing recess.

As shown in FIG. 6, a hole 43a with a square cross-section is formed in a central portion of the elastic member 43 of each mount body 41. One of the projections 11 is fitted in each hole 43a. In this manner, the right and left projections (i.e. the supported portions) 11 and 11 of the radiator 1 are inserted and fitted into the holes 43a and 43a of the elastic members 43 and 43 of the mounts 40 and 40, respectively. In addition, the mount bodies 41 and 41 of the mounts 40 and 40 are mounted in mounting portions 50 and 50, which will be described later. As a result, the radiator 1 is supported by the shroud 21 via the two mounts 40 and 40 to vibrate vertically. The projection 11 fitted in the hole 43a of the elastic member 43 of each mount body 41 has a square cross-section as described above. The elastic member 43 (i.e., the mount body 41) is formed immovable around the projection 11. Each hole 43a and each projection 11 may have any cross-sectional shape, as long as the elastic member 43 is immovable around the associated projection 11.

Figure 7:
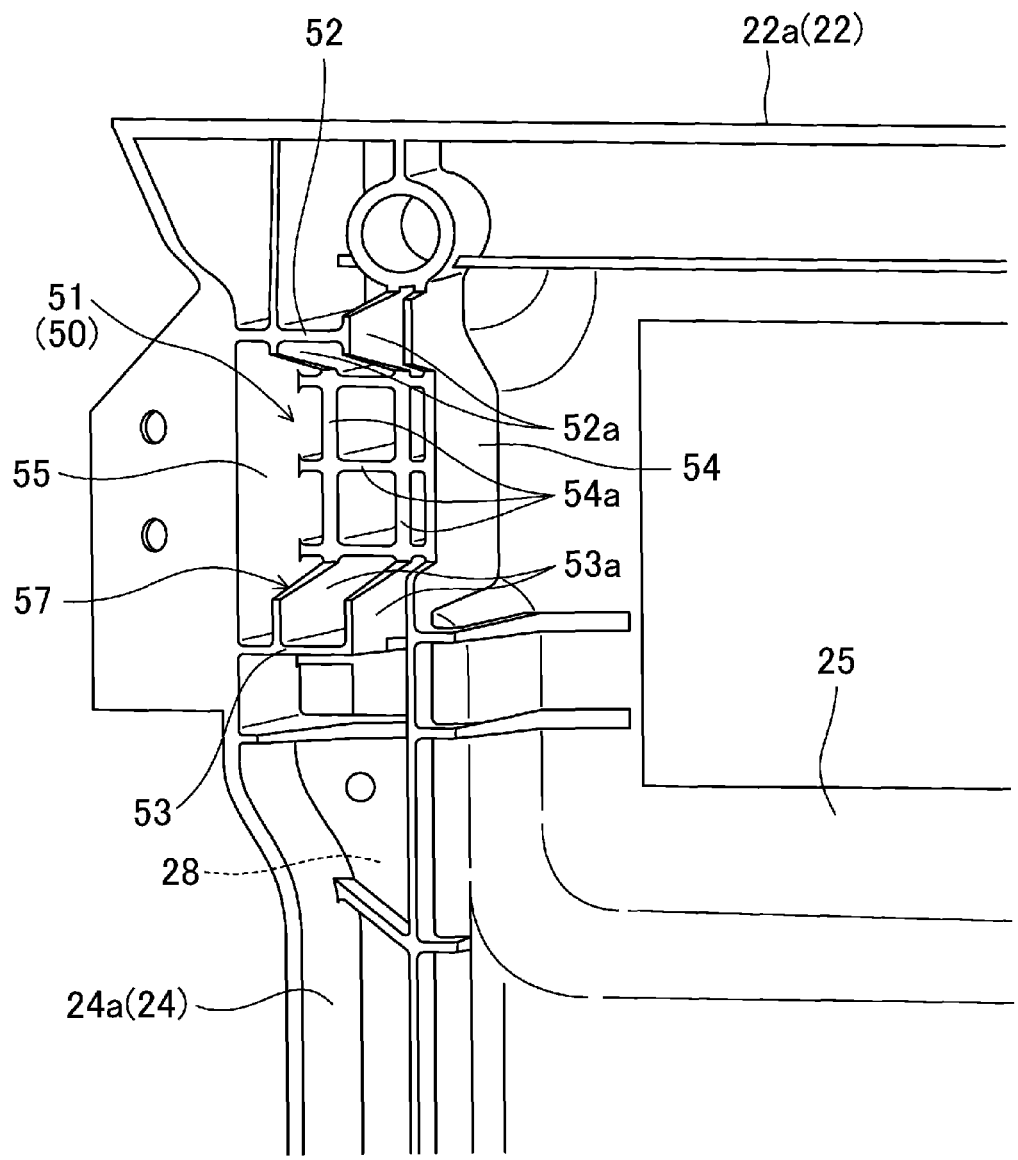
FIG. 7 is an enlarged perspective view of the housing recess and its proximity as viewed from the inside of the vehicle in the vehicle width direction and the rear of the vehicle. The housing recess is located on the left of the shroud.

As shown in FIG. 7, the mounting portion 50, in which the mount body 41 of the associated mount 40 is mounted, is located higher than the fixed portion 28 on the back surface of the side wall 24 of the shroud 21 (at the upper end portion of the back surface of each side wall 24). In this exemplary embodiment, a housing recess 51, which will be described later, serves as the mounting portion 50. Each mounting portion 50 includes a receiver 57 supporting the lower surface of the mount body 41 (i.e. the lower surface of the holding member 44). The receivers 57 and 57 in the two (i.e., the right and left) mounting portions receive the whole weight of the radiator 1. In this exemplary embodiment, each receiver 57 is located higher than and close to the fixed portion 28 in the associated side wall 24.

The mount body 41 of the mount 40 is mounted and housed in the mounting portion 50, which is the housing recess 51. The housing recess 51 is recessed forward and open backward. Each housing recess 51 includes an upper wall 52, a lower wall 53, a front wall 54 (i.e. the side wall 24), and an outer wall 55 in the vehicle width direction (i.e., the rear extension 24a of the side wall 24). That is, each housing recess 51 is surrounded by these walls. The mount body 41 (i.e., the holding member 44) of each mount 40 is fixed to one of the side walls 24 and 24 of the shroud 21 by the fixing bracket 45, while being fitted in the housing recess 51. In this exemplary embodiment, the inside of each housing recess 51 is also open in the vehicle width direction. In the following description, the rear of the housing recess 51 is referred to as an "open side" of the housing recess 51. The side opposite to the open side, that is, the front of the housing recess 51 is referred to as an "inner side" of the housing recess 51. Each housing recess 51 may have an inner wall in the vehicle width direction. In this case, a cutout is formed in the inner wall of the housing recess 51 in the vehicle width direction. The cutout is cut forward from the rear end surface of the inner wall in the vehicle width direction and allows the projection 11 to pass therethrough.

The upper surface of the lower wall 53 of each housing recess 51 serves as the receiver 57 of each mounting portion 50. The fixing bracket 45 is located behind the housing recess 51 to cover the open side at the rear of the housing recess 51. The weight of the radiator 1 is rarely applied to the fixing bracket 45 and the bolts 46 and 46. Thus, the fixing bracket 45 may fix the mount body 41 (i.e., the mount 40) to the housing recess 51 so firmly that the mount body 41 is not detached from the housing recess 51.

The lower wall 53 of each housing recess 51 includes a plurality of (two in this exemplary embodiment) ribs 53a and 53a extending longitudinally and vertically. The ribs 53a and 53a are spaced apart from each other in the vehicle width direction. The upper surfaces of the ribs 53a and 53a of the lower wall 53 serve as the receivers 57 of the mounting portions 50. The ribs 53a and 53a allow the lower wall 53 of the housing recess 51 to be thinner and stronger. No rib 53a of the lower wall 53 may be provided, and almost the entire lower wall 53 may serve as the receiver 57.

Like the lower wall 53, the upper wall 52 of each housing recess 51 includes a plurality of (two in this exemplary embodiment) ribs 52a and 52a extending longitudinally and vertically. The upper surface of the mount body 41 (i.e., the upper surface of the holding member 44) abuts on the lower surfaces of the ribs 52a and 52a. To be exact, there is a slight gap therebetween, when the mount body 41 is housed in the housing recess 51. The front wall 54 also includes ribs 54a, 54a, . . . .

The receiver 57 of each mounting portion 50 (the upper surfaces of the ribs 53a and 53a of the lower wall 53) is inclined upward toward the inside of the housing recess 51. In accordance with the inclined surface of the receiver 57, the lower surface of the holding member 44 (i.e., the lower surface of the mount body 41) is, as an inclined portion 44a, inclined upward toward the inside of the housing recess 51. This is to facilitate the attachment of the radiator 1 and the mounts 40 and 40 to the shroud 21, as will be described later. The lower surface of the upper wall 52 is inclined downward toward the inside of the housing recess 51. In accordance with the inclined surface of the upper wall 52, the upper surface of the holding member 44 (i.e., the upper surface of the mount body 41) is, as an inclined portion 44b, inclined downward toward the inside of the housing recess 51.

Figure 8:
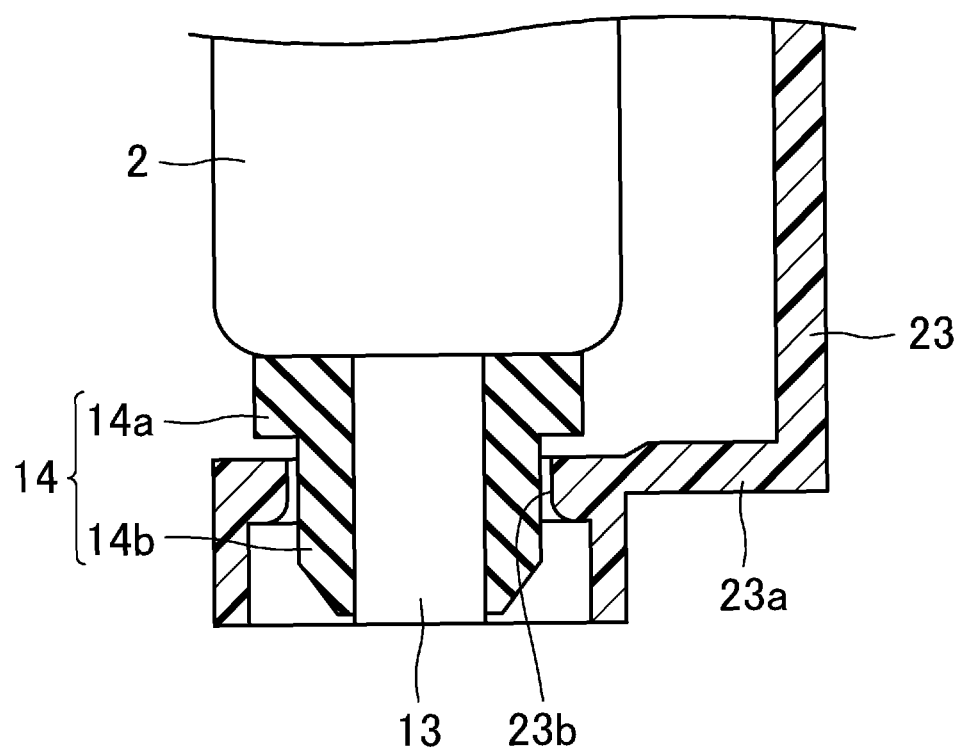
FIG. 8 is a cross-sectional view of a pin and an elastic member, which are inserted into a hole. The pin is provided on the lower surface of a tank of the radiator. The elastic member surrounds the pin. The hole is formed in a rear extension of the lower wall of the shroud.

In this exemplary embodiment, as shown in FIG. 8, a pin 13 is provided on the lower surface of the radiator 1 (on the lower surface of each of the right and left tanks 2 and 2 in this exemplary embodiment). The pin 13 projects downward and is covered by an elastic member 14. The elastic member 14 around the pin 13 is made of rubber, and fixed to the lower surface of the tank 2. The elastic member 14 includes a large-diameter portion 14a closer to the tank 2, and a small-diameter portion 14b farther from the associated tank 2. The number of the pins 13 on the lower surface of the radiator 1 may be one, three or more.

On the other hand, a hole 23b for insertion is formed on each end of the rear extension 23a of the lower wall 23 of the shroud 21 in the vehicle width direction (right under the right or left tank 2). The left pin 13 and the small-diameter portion 14b of the elastic member 14 are inserted into the left hole 23b for insertion. The right pin 13 and the small-diameter portion 14b of the elastic member 14 are inserted into the right hole 23b for insertion. A predetermined degree of a gap is formed between the outer peripheral surface of the small-diameter portion 14b of the elastic member 14 and the inner peripheral surface of the hole 23b for insertion. Assume that the radiator 1 attempts to vibrate with respect to the shroud 21 in the direction perpendicular to the vertical direction (i.e., in the horizontal direction such as the longitudinal direction and the vehicle width direction) at a degree greater than the predetermined degree. The outer peripheral surface of the small-diameter portion 14b of at least one of the elastic members 14 abuts on the inner peripheral surface of the associated hole 23b for insertion to reduce horizontal vibrations of such a great degree. A gap is also formed between the lower surface of the large-diameter portion 14a of each elastic member 14 and the upper surface of the rear extension 23a of the lower wall 23. A gap is also formed between the portion of the lower surface of the radiator 1 other than the tanks 2 and 2 and the upper surface of the rear extension 23a. Even if the radiator 1 vibrates vertically with respect to the shroud 21, the lower surface of the large-diameter portion 14a of each elastic member 14 and the lower surface of the radiator 1 (except the tanks 2 and 2) do not abut on the upper surface of the rear extension 23a of the lower wall 23.

It will now be described how to assemble the radiator 1 and the two mounts 40 and 40 with a shroud 21.

First, a worker inserts and fits the right and left projections 11 and 11 of the radiator 1 into the holes 43a and 43a of the elastic members 43 and 43 of the mount bodies 41 and 41 of the mounts 40 and 40. As a result, the mounts 40 and 40 are attached to the right and left projections 11 and 11, respectively. That is, the projections 11 and 11 are engaged with the mounts 40 and 40, respectively. The hole 43a of each elastic member 43 and the associated projection 11 have a square cross-section. The mount body 41 (i.e., the elastic member 43 and the holding member 44) attached to the associated projection 11 is immovable about the projection 11.

Then, the worker puts the radiator 1 on the upper surface of the rear extension 23a of the lower wall 23 of the shroud 21. The radiator 1 includes the mounts 40 and 40 attached to the right and left projections 11 and 11. At this time, the pins 13 and 13 and the small-diameter portions 14b and 14b of the elastic members 14 and 14 need to be inserted into the holes 23b and 23b in the rear extension 23a of the lower wall 23. The mounts 40 and 40 attached to the right and left projections 11 and 11 are not yet housed in the housing recesses 51 and 51. Thus, the radiator 1 put on the upper surface of the rear extension 23a of the lower wall 23 is inclined such that the top of the radiator 1 is located rearmost. Even if the radiator 1 is inclined in this manner, the pins 13 and 13 and the small-diameter portions 14b and 14b of the elastic members 14 and 14 can be inserted into the holes 23b and 23b, respectively. This is because the gap of a predetermined degree is formed between the outer peripheral surface of the small-diameter portion 14b of each elastic member 14 and the inner peripheral surface of the associated hole 23b for insertion. The predetermined degree is determined in view of this configuration, in addition to the reduction in the strong horizontal vibrations.

Then, the worker moves the radiator 1, which is inclined on the upper surface of the rear extension 23a of the lower wall 23, about the lower surface of the radiator 1 so that the upper part of the radiator 1 moves forward. At the same time, the worker inserts the mount bodies 41 and 41 of the mounts 40 and 40 attached to the right and left projections 11 and 11 into the housing recesses 51 and 51 of the shroud 21 from the open side (i.e., the rear) to the inside (i.e., the front).

As described above, the receiver 57 of each mounting portion 50 (i.e., the upper surfaces of the ribs 53a and 53a of the lower wall 53) is inclined upward toward the inside of the housing recess 51. The lower surface of the holding member 44 is the inclined surface 44a, which is inclined upward toward the inside of the housing recess 51. The movement of the radiator 1 inserts the mount bodies 41 and 41 into the housing recesses 51 and 51 easily and substantially simultaneously.

In this exemplary embodiment, the movement of the radiator 1 inserts the mount bodies 41 and 41 into the housing recesses 51 and 51, respectively, at almost the same time. This insertion slides the lower surface (the inclined surface 44a) of the holding member 44 of each mount body 41 on the inclined surface of the receiver 57. This slide gradually pushes up each mount body 41 in the progress of the insertion. This push-up also pushes up the projections 11 and 11 so that the radiator 1 floats above the upper surface of the rear extension 23a of the lower wall 23 of the shroud 21. After completion of the insertion, gaps are formed between the lower surface of the large-diameter portion 14a of each elastic member 14 and the upper surface of the rear extension 23a of the lower wall 23, and between the portion of the lower surface of the radiator 1 without the tanks 2 and 2 and the upper surface of the rear extension 23a.

If the fixing brackets 45 are fixed to the side walls 24 of the shroud 21 by the bolts 46 and 46 after the end of the insertion, each mount body 41 (i.e., each mount 40) is mounted and housed in and not detached from the associated housing recess 51.

In this manner, the mount bodies 41 and 41 of the mounts 40 and 40 attached to the right and left projections 11 and 11 of the radiator 1 put on the bottom of the shroud 21 (i.e., on the upper surface of the rear extension 23a of the lower wall 23) into the housing recesses 51 and 51 in the side walls 24 and 24 of the shroud 21 in the vehicle width direction from the open side to the inside. At this time, the receiver 57 of each housing recess 51 is inclined upward toward the inside of the housing recess 51 so that the insertion allows the radiator 1 to float above the bottom of the shroud 21 (i.e., the upper surface of the rear extension 23a of the lower wall 23).

When the radiator 1 is replaced with a new one in a service factory, for example, the worker detaches the radiator 1 from the shroud 21, which is fixed to the bumper beam 61 and the apron reinforcing members 68 and 68, and then attaches a new radiator 1 to the shroud 21.

In order to detach the radiator 1 from the shroud 21, the worker loosens the bolts 46 and 46 from the rear of each mount body 41 (i.e., the rear of the shroud 21). Then, the worker pulls the mount bodies 41 and 41 of the mounts 40 and 40 out of the housing recesses 51 and 51 of the shroud 21, while falling down the top of the radiator 1 rearward. During this process, the radiator 1 comes into contact with the upper surface of the rear extension 23a of the lower wall 23 of the shroud 21, and thus does not drop from the shroud 21.

When the mount bodies 41 and 41 of the mounts 40 and 40 are completely removed from the housing recesses 51 and 51, the radiator 1 is inclined like before the attachment, that is, the insertion of the mount bodies 41 and 41 into the housing recesses 51 and 51. The mounts 40 and 40 are attached to the projections 11 and 11 of the radiator 1, respectively. When the worker pulls up this radiator 1, the radiator 1 is completely detached from the shroud 21.

If there is no problem with the mounts 40 and 40, the worker detaches the mounts 40 and 40 from the projections 11 and 11 of the radiator 1, which has been detached from the shroud 21, and attaches these mounts 40 and 40 to projections 11 and 11 of the new radiator 1. Then, the worker attaches the radiator 1 and the mounts 40 and 40 to the shroud 21 as in the method described above.

In this exemplary embodiment, the housing recess 51 (i.e., the mounting portion 50) is located higher than the fixed portion 28 on each vertically extending side wall 24 of the shroud 21. The mount body 41 of each mount 40 is mounted and housed in the housing recess 51. Each housing recess 51 has the receiver 57 supporting the lower surface of the mount body 41, thereby providing sufficient strength to support the mounts 40 and 40 of the shroud 21 (and eventually the radiator 1). Specifically, the vertically extending side walls 24 and 24 have higher strength against a vertical load than the horizontally extending upper and lower walls 22 and 23. Thus, the shroud 21 has sufficient strength to support the mounts 40 and 40 (and eventually the radiator 1). The fixed portion 28 is provided on the side wall 24 on each side of the shroud 21 in the vehicle width direction. The shroud 21 as a whole including the radiator 1 is supported with sufficient strength against the bumper beam 61. The fixed portion 28 of each side wall 24 is usually reinforced (by the reinforcing ribs 24b, 24b, . . . , in this exemplary embodiment). Thus, the receiver 57 of the housing recess 51 is provided near the reinforced fixed portion 28 of each side wall 24 to increase the strength for supporting the mounts 40 and 40 of the shroud 21.

In addition, the fixing bracket 45 is provided behind the mount body 41 of each mount 40 to fix the mount body 41 to each of the side walls 24 and 24 of the shroud 21. The fixing bracket 45 is attached to and detached from the shroud 21 by fastening and loosening the bolts 46 and 46 from the rear of each mount body 41 (i.e., the rear of the shroud 21). As a result, the radiators 1 are easily attached to and detached from the shroud 21 when the used radiator 1 is replaced with a new one.

Second Exemplary Embodiment

FIGS. 9 to 13 illustrate a second exemplary embodiment. The second exemplary embodiment differs from the first exemplary embodiment in the configuration of the mount body 41 of each mount 40 and the configuration of the mounting portion 50 associated with the configuration of the mount body 41. In FIGS. 9 to 13, the same reference characters as those in the first exemplary embodiment are used to represent equivalent elements, and the explanation thereof will be omitted.

Specifically in this exemplary embodiment, the lower surface of the mount body 41 of each mount 40 (i.e., the lower surface of the holding member 44) has a projection 44c. The projection 44c projects downward from an intermediate portion of the lower surface in the vehicle width direction, and extends longitudinally. The portion of the lower surface of the holding member 44 except for the projection 44c (i.e., except for both the sides of the projection 44c) is the inclined portion 44a with the same or similar shape as the inclined portion 44a of the first exemplary embodiment. The lower surface of the projection 44c, which is also the lower surface of the mount body 41, includes the inclined portion 44d, and a curving portion 44e (see FIGS. 11 and 12). The curving portion 44e is provided in front of the inclined portion 44d to be continuous with the inclined portion 44d, and curves upward toward the front of the vehicle.

On the other hand, the upper surface of the lower wall 53 of each housing recess 51, which serves as the mounting portion 50, has a fitting recess 53b. The fitting recess 53b receives the projection 44c fitted therein, and extends longitudinally. Longitudinally and vertically extending ribs 53c and 53c (two in this exemplary embodiment) are formed on the bottom surface of this fitting recess 53b. The ribs 53c and 53c are spaced apart from each other in the vehicle width direction.

As in the exemplary embodiment, each mounting portion 50 includes a receiver 57 supporting the lower surface of the mount body 41 (i.e., the lower surface of the holding member 44) in this exemplary embodiment. The receiver 57 of each mounting portion 50 is the upper surface of the lower wall 53 of the housing recess 51 (particularly, the bottom surface of the fitting recess 53b). In this exemplary embodiment, as described above, the ribs 53c and 53c are formed on the bottom surface of the fitting recess 53b, and the upper surfaces of the ribs 53c and 53c serve as the receiver 57 of the mounting portion 50. The upper surfaces of the ribs 53c and 53c are inclined like the upper surfaces of the ribs 53a and 53a in the first exemplary embodiment. The mount bodies 41 and 41 of the mounts 40 and 40 are attached to the right and left projections 11 and 11 of the radiator 1 put on the upper surface of the rear extension 21. The mount bodies 41 and 41 are inserted into the housing recesses 51 and 51 in the side walls 24 and 24 of the shroud 21 in the vehicle width direction from the open side to the inside. At this time, the upper surfaces of the ribs 53c and 53c are inclined upward toward the inside of the housing recess 51 so that this insertion allows the radiator 1 to float above the upper surface of the rear extension 23a. Alternatively, no rib 53c may be provided, and almost the entire bottom surface of the fitting recess 53 may serve as the receiver 57 of the mounting portion 50.

The inclined portion 44d of the projection 44c of each mount body 41 abut on the upper surfaces of the ribs 53c and 53c. In accordance with the inclined surface of the receiver 57, the inclined portion 44d of each mount body 41 is inclined upward toward the front to be continuous with the curving portion 44e.

Figure 12:
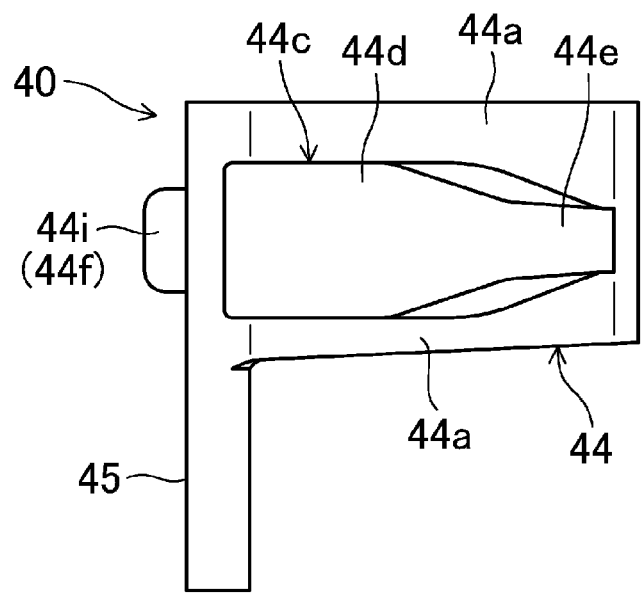
FIG. 12 illustrates the mount mounted in a mounting portion according to the second exemplary embodiment as viewed from the bottom.

As shown in FIG. 12, the width of a front part of the projection 44c of each mount body 41 in the vehicle width direction decreases (i.e., is tapered) toward the front. That is, the side surfaces of the projection 44c in the vehicle width direction come closer to each other toward the front of the projection 44c.

As in the first exemplary embodiment, when the radiator 1 and the two mounts 40 and 40 are attached to the shroud 21, the worker moves the radiator 1, which is inclined on the upper surface of the rear extension 23a of the lower wall 23, about the lower surface of the radiator 1 so that the top of the radiator 1 moves forward. At the same time, the worker inserts the mount bodies 41 and 41 of the mounts 40 and 40 attached to the right and left projections 11 and 11 into the housing recesses 51 and 51 of the shroud 21 from the open side (i.e., the rear) to the inside (i.e., the front). At this time, the projection 44c of each mount body 41 needs to be fitted in the fitting recess 53b in the lower wall 53 of the associated housing recess 51. The projection 44c of each mount body 41 is tapered toward its front. Even if the radiator 1 is slightly shifted from the shroud 21 in the vehicle width direction, the projection 44c is guided by the taper to be fitted into the fitting recess 53b. After the projection 44c is completely fitted into the fitting recess 53b (i.e., after the mount body 41 is completely inserted into the housing recess 51), the radiator 1 is positioned with respect to the shroud 21 in the vehicle width direction.

The curving portion 44e of the projection 44c facilitates placement of the inclined portion 44d continuous with the curving portion 44e on the inclined surface of the receiver 57, when each mount body 41 is inserted into the housing recess 51. This facilitates, together with the taper, fitting of the projection 44c into the fitting recess 53b. During the insertion of the mount body 41 into the housing recess 51, the inclined portion 44d slides on the upper surfaces of the ribs 53c and 53c. However the curving portion 44e floats above the upper surfaces of the ribs 53c and 53c. Thus, the sliding friction of the inclined portion 44d against the upper surfaces of the ribs 53c and 53c is lower than the sliding friction of the inclined portion 44a against the upper surfaces of the ribs 53a and 53a in the first exemplary embodiment.

The portion of the upper surface of the lower wall 53 of each housing recess 51 without the fitting recess 53b (i.e., both the sides of the recess 53) has the same shape at the same height as the upper surfaces of the ribs 53a and 53a in this first exemplary embodiment. The inclined portion 44a abuts on this portion. Basically, the upper surfaces of the ribs 53c and 53c on the bottom surface of the fitting recess 53 serve as the receiver 57 of the mounting portion 50. The upper surfaces of the ribs 53c and 53c support the lower surface of the mount body 41. The portion of the upper surface of the lower wall 53 other than the fitting recess 53b auxiliary serves as the receiver 57 of the mounting portion 50.

Figure 9:
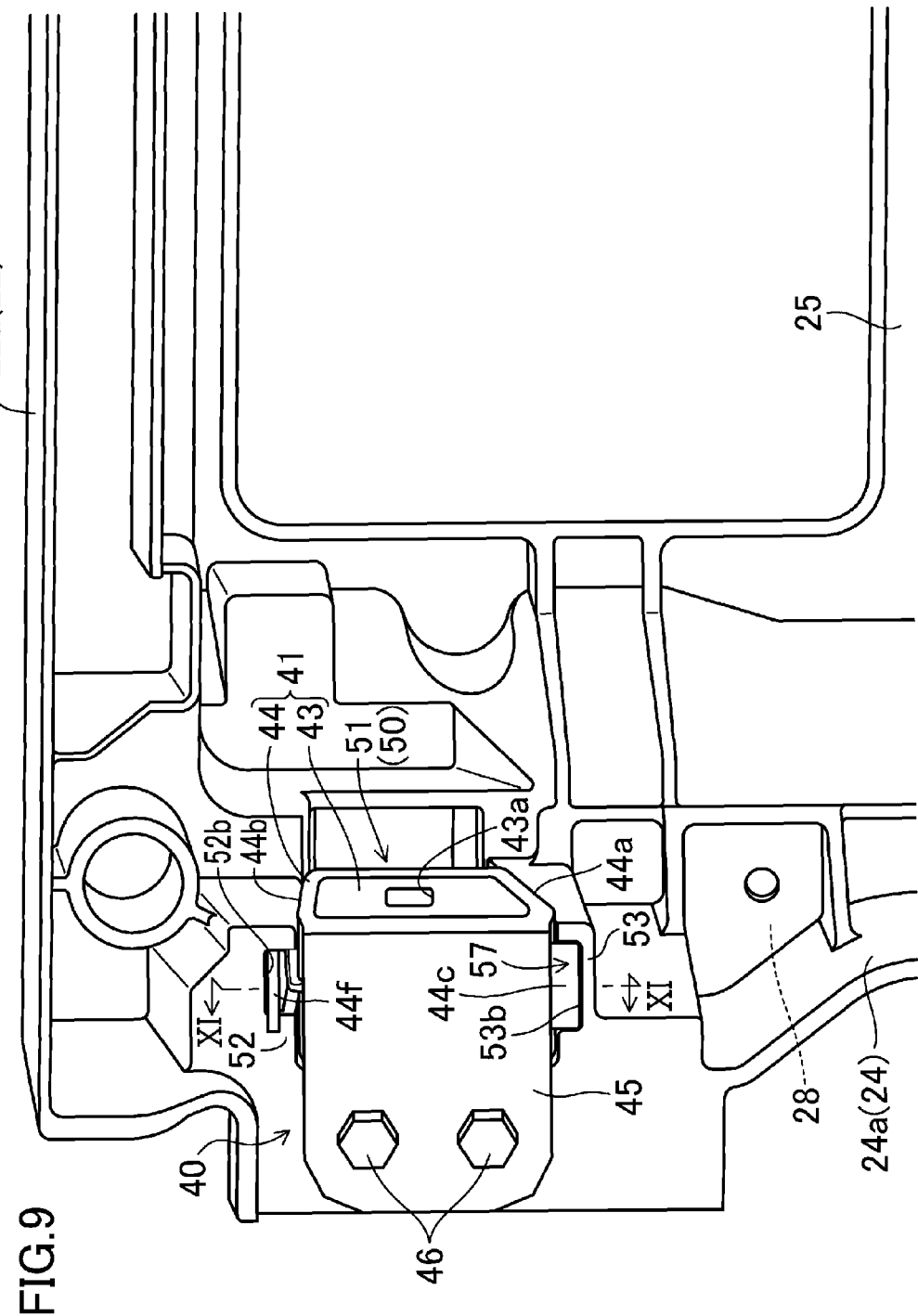
FIG. 9 is an enlarged perspective view of a housing recess, its proximity, and a mount body (i.e., the mount) according to a second exemplary embodiment as viewed from the inside of the vehicle in a vehicle width direction and the rear of the vehicle. The housing recess is located on the left of a shroud. The mount body is mounted and housed in the housing recess.
Figure 10:
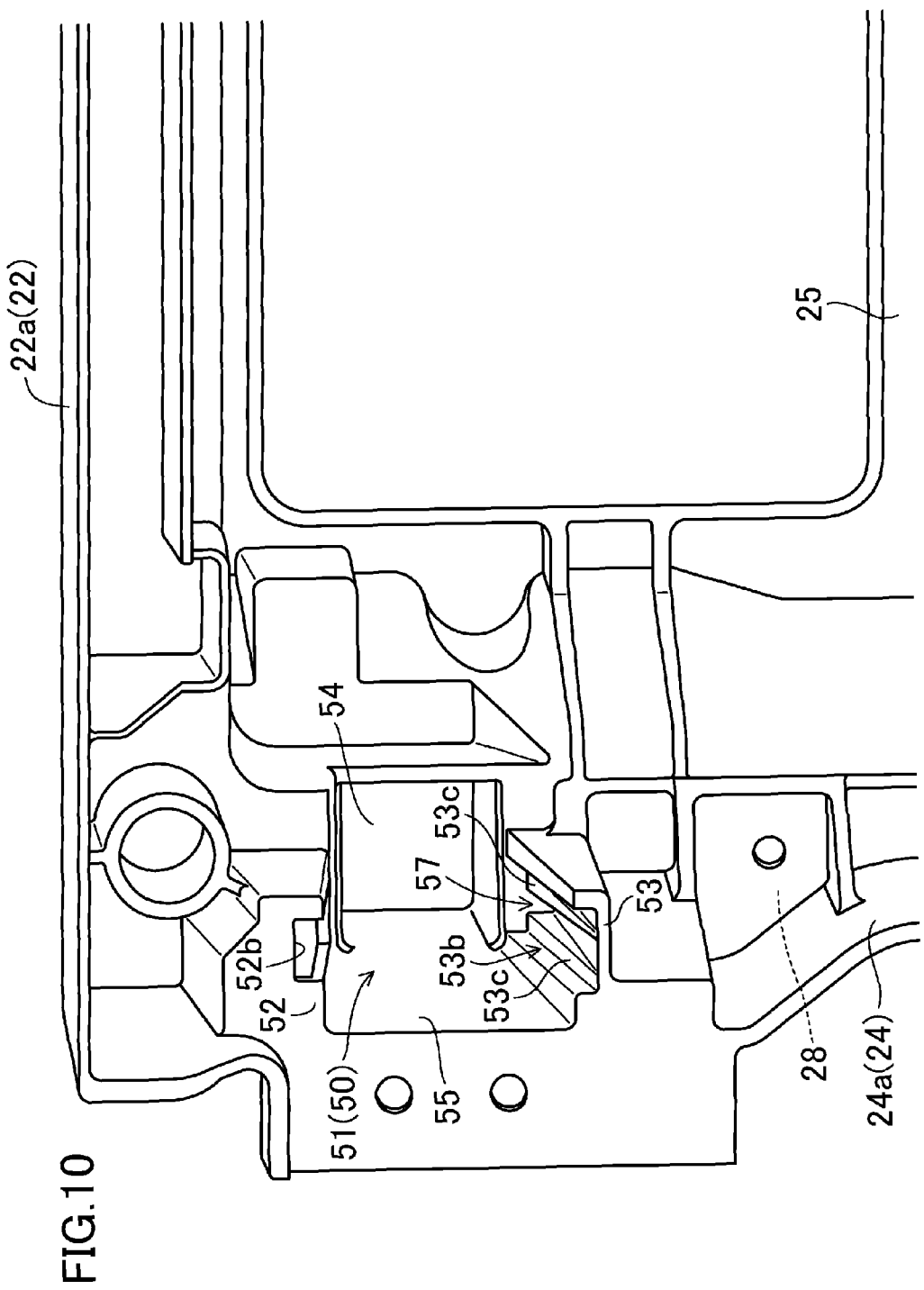
FIG. 10 is a perspective view corresponding to FIG. 9 but excluding a mount.
Figure 11:
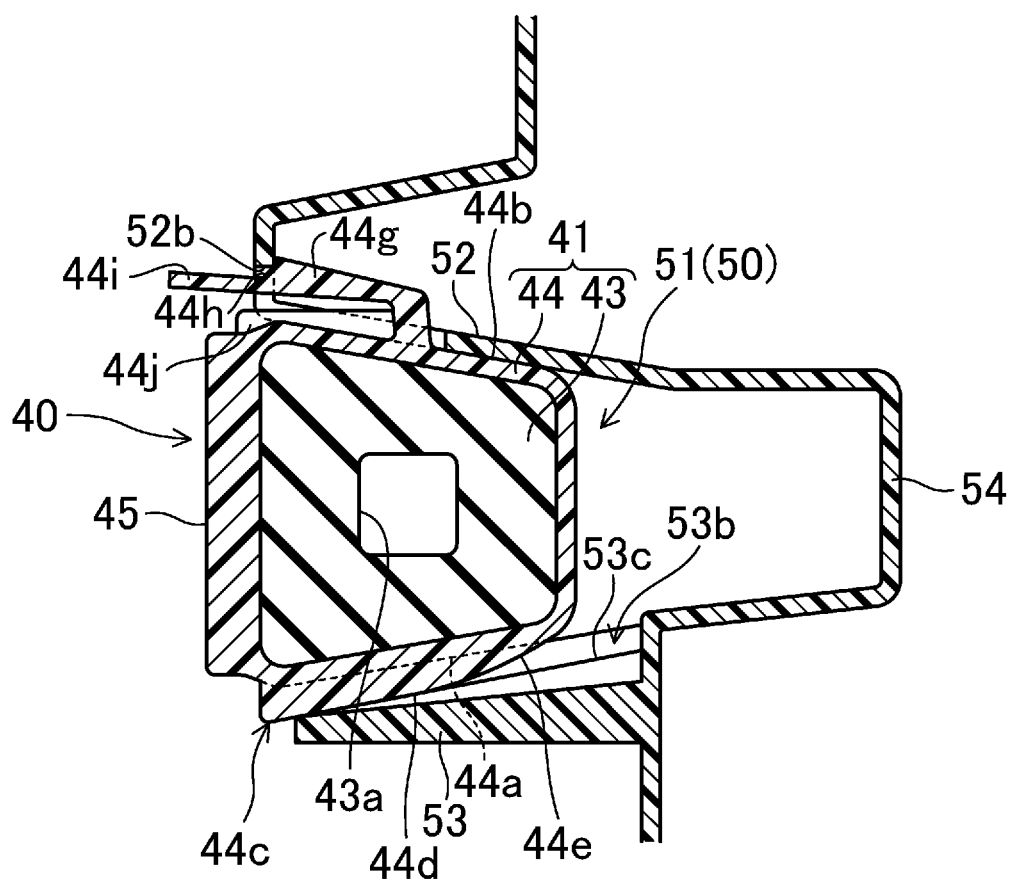
FIG. 11 is a cross-sectional view taken along the line XI-XI of FIG. 9.
Figure 13:
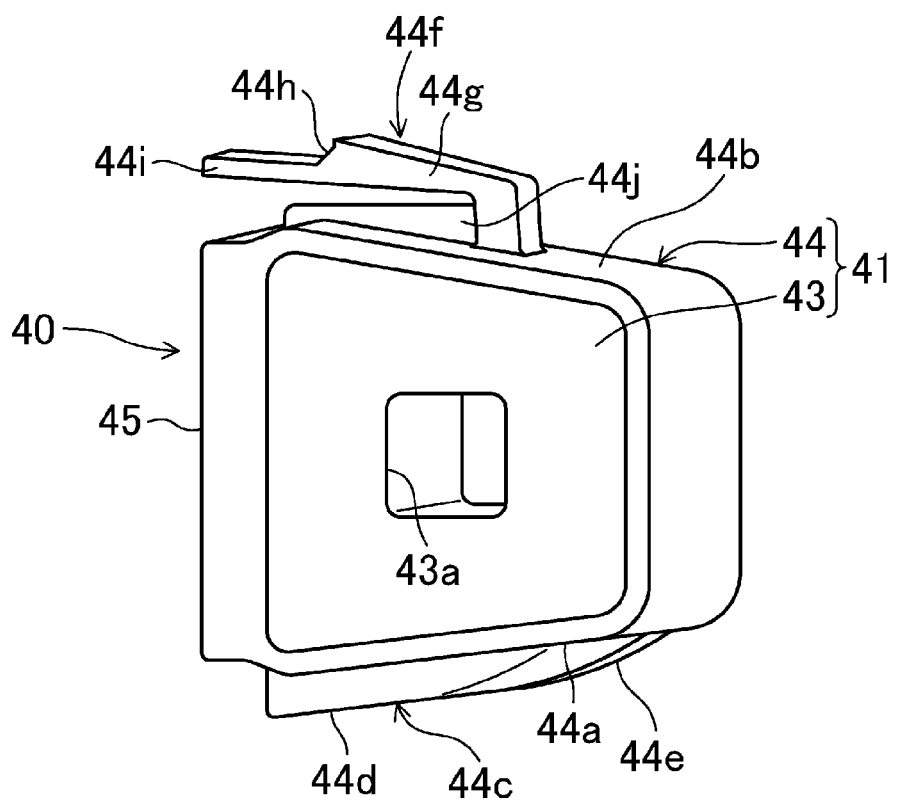
FIG. 13 is a perspective view of the mount according to the second exemplary embodiment.

A clip 44f is provided on the upper surface of each mount body 41 (the upper surface of the holding member 44), and is engaged with the shroud 21, when the mount body 41 is mounted in the mounting portion 50 (see FIGS. 9, 11, and 13). In accordance with the clip 44f, an engagement recess 52b is formed in the upper wall 52 of each housing recess 51. In this exemplary embodiment, neither ribs 52a nor ribs 54a are provided on the upper wall 52 or the front wall 54 as in the first exemplary embodiment. The front wall 54 is located further forward than that in the first exemplary embodiment. The front wall 54 may be located in the same longitudinal position as in the first exemplary embodiment. Ribs 54a, 54a, . . . may be provided like in the first exemplary embodiment.

The clip 44f has an extension 44g. The extension 44g extends upward from the substantially central portion of the upper surface of the holding member 44 in the longitudinal direction, and extends right rearward. This extension 44g is flexible downward. An engaged portion 44h is provided near the rear end of the extension 44g. The engaged portion 44h is engaged with the engagement recess 52b. After the mount body 41 is completely inserted into the housing recess 51, the engaged portion 44h is engaged with the engagement recess 52b so that the mount body 41 holds the shroud 21 temporarily. With this configuration, the mount body 41 is not removed from the housing recess 51, even if the fixing bracket 45 is not fixed to the shroud 21.

The portion of the extension 44g behind the engaged portion 44h extends more rearward than the fixing bracket 45 to serve as a handle 44i, which is operable by a worker. When the worker presses down the handle 44i, the extension 44g warps downward to disengage the engaged portion 44h from the engagement recess 52b. When the used radiator 1 is replaced with a new one, the handle 44i is used to take the mount body 41 out of the housing recess 51. A stopper 44j is provided on the upper surface of the holding member 44 to face the bottom of the extension 44g. The extension 44g abuts on the stopper to reduce excessive downward warpage of the extension 44g.

As described above, this embodiment provides the same or similar advantages as the first exemplary embodiment. Each mount body 41 is easily inserted into the associated housing recess 51 when the radiator 1 and the two mounts 40 and 40 are attached to the shroud 21. After the mount body 41 is completely inserted into the housing recess 51, temporary holding of the clip 44f facilitates the fixture of the fixing bracket 45 to the shroud 21. The radiator 1 is positioned with respect to the shroud 21 in the vehicle width direction.

The present disclosure is not limited to the first and second exemplary embodiments described above. Any replacement may be made within the scope of the claims.

For example, in the first and second exemplary embodiments, the housing recess 51 (i.e., the mounting portion 50) is located higher than the fixed portion 28 on the back surface of each side wall 24 of the shroud 21. The mount body 41 of each mount 40 is mounted and housed in the housing recess 51. The fixing bracket 45 is provided behind the mount body 41 of each mount 40. Alternatively, the mounting portion 50 may be located higher than the fixed portion 28 on the front surface of each side wall 24 of the shroud 21. The mount body 41 of each mount 40 is mounted in the mounting portion 50. The fixing bracket 45 may be provided in front of the mount body 41 of the mount 40. In this case, an insertion hole is formed in each side wall 24 of the shroud 21. One of the projections 11 is inserted into the insertion hole from the rear of the shroud 21 to be located in front of the shroud 21. With no mount 40 attached to the associated projection 11, the radiator 1 is attached to the shroud 21 so that the projection 11 is located in the mounting portion 50 on the front surface of each side wall 24 of the shroud 21 via the insertion hole. Then, while each mount 40 is attached to the associated projection 11, the mount body 41 of the mount 40 is mounted in the mounting portion 50. After that, each fixing bracket 45 is fastened to the associated side wall 24 from the front of the mount body 41 to fix the mount body 41 to the side wall 24 of the shroud 21.

In the first and second exemplary embodiments, the housing recess 51 serves as the mounting portion 50 in which the mount body 41 of each mount 40 is mounted. The mounting portion 50 is not limited to the housing recess as long as the mounting portion 50 includes the receiver 57 supporting the lower surface of the associated mount body 41.

In the first and second exemplary embodiments, the radiator 1 is a cross-flow radiator. Alternatively, the radiator 1 may be a down-flow radiator with tanks at both vertical ends.

In addition, in the first and second exemplary embodiments, an example has been described where the vehicle heat exchanger is a radiator for cooling an engine coolant. Alternatively, the vehicle heat exchanger may be a radiator for cooling an intercooler coolant or a condenser for an air conditioner.

The embodiments described above are mere examples, and are not to be construed as limiting the scope of the present disclosure. The scope of the present disclosure is defined by the claims. Variations and modifications of equivalents of the claims are intended to fall within the scope of the present disclosure.

What is claimed is:

1. A structure for mounting a heat exchanger in a vehicle, the structure comprising:
    a shroud supporting the heat exchanger, allowing vertical vibrations of the heat exchanger, and including, on each side of the shroud in a vehicle width direction, a fixed portion fixed to a body member of the vehicle; and
    a mount supporting a supported portion, and allowing vertical vibrations of the supported portion with respect to the side of the shroud in the vehicle width direction, the supported portion provided on each side of the heat exchanger in the vehicle width direction, wherein
    the mount includes a mount body holding an elastic member, and supporting the supported portion on the side of the shroud via the elastic member,
    the mount body of the mount is mounted in a mounting portion located higher than the fixed portion on the side of the shroud,
    a receiver supporting a lower surface of the mount body serves as the mounting portion, and
    a fixing bracket for fixing the mount body to the side of the shroud is provided in front of or behind the mount body of the mount in the vehicle.

2. The structure of claim 1, wherein
    a housing recess serves as the mounting portion, is provided in a surface of the side of the shroud facing the rear of the vehicle, houses the mount body of the mount, and has an open rear end,
    an upper surface of a lower wall of the housing recess serves as the receiver of the mounting portion, and
    the fixing bracket is provided behind the housing recess in the vehicle.

3. The structure of claim 2, wherein
    the upper surface of the lower wall of the housing recess is an inclined surface inclined upward toward an inside of the housing recess so that an insertion of the mount body of the mount attached to the supported portion, which is located on each side, in the vehicle width direction, of the heat exchanger put on a bottom of the shroud, into the housing recess from the open rear end to the inside of the housing recess, which is provided on each side of the shroud in the vehicle width direction, allows the heat exchanger to float above the bottom of the shroud.

4. The structure of claim 3, wherein
    a lower surface of the mount body includes an inclined portion inclined in accordance with the inclined surface of the receiver, and a curving portion provided in front of the inclined portion in the vehicle to be continuous with the inclined portion, and curving upward toward the front of the vehicle.

5. The structure of claim 4, wherein
    the lower surface of the mount body includes a projection projecting downward from an intermediate portion of the lower surface in the vehicle width direction, and extending in a vehicle longitudinal direction, a lower surface of the projection includes the inclined portion and the curving portion, the upper surface of the lower wall of the housing recess includes a fitting recess receiving the projection fitted therein, and recessed to extend in the vehicle longitudinal direction, and a bottom surface of the fitting recess includes the inclined surface of the receiver.

6. The structure of claim 5, wherein a width of a front part of the projection in the vehicle width direction decreases toward the front of the vehicle.

7. The structure of claim 2, wherein the lower wall of the housing recess includes ribs extending in the vehicle longitudinal direction and a vehicle vertical direction, and upper surfaces of the ribs of the lower wall of the housing recess serve as the receiver of the mounting portion.

8. The structure of claim 1, wherein a clip is provided on the upper surface of the mount body, and is engaged with the shroud, when the mount body is mounted in the mounting portion.

9. The structure of claim 1, wherein the heat exchanger includes a tank on each side in the vehicle width direction, the tank extending in a vehicle vertical direction, and the supported portion is provided on the tank.

10. The structure of claim 1, wherein the supported portion is a projection projecting outward from the side of the heat exchanger in the vehicle width direction, a hole is formed in the elastic member of the mount to receive the projection fitted therein, and the hole of the elastic member of the mount and the projection fitted in the hole are configured not to allow movement of the elastic member about the projection.

11. The structure of claim 1, wherein the lower surface of the heat exchanger is provided with a pin projecting downward and having a circumference covered by the elastic member, an insertion hole, into which the pin and the elastic member are inserted, is formed on the bottom of the shroud, and a gap of a predetermined degree is formed between an outer peripheral surface of the elastic member and an inner peripheral surface of the insertion hole.

12. The structure of claim 1, wherein the heat exchanger includes a cooling fan configured to generate cool air passing through the heat exchanger from its front to rear, the shroud includes an enclosure surrounding upper, lower, and two side surfaces of the heat exchanger in the vehicle width direction, and a sealing member is provided between the enclosure and each of the upper, lower, and side surfaces of the heat exchanger in the vehicle width direction to reduce the cool air passing therethrough and returning to the front of the heat exchanger.

* * * * *